July 9, 1935.  C. L. DREW  2,007,850
MIXER
Filed Nov. 13, 1934
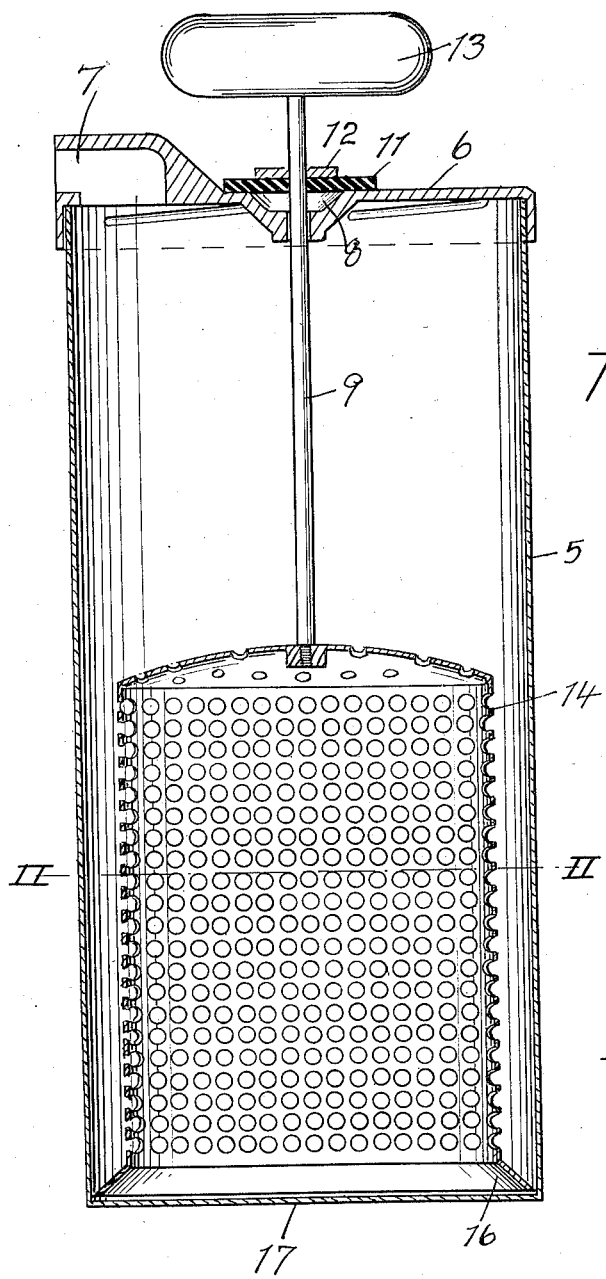
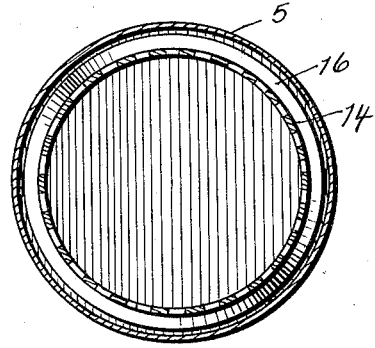
INVENTOR.

Patented July 9, 1935

2,007,850

UNITED STATES PATENT OFFICE 2,007,850

MIXER

Clayton L. Drew, San Francisco, Calif.

Application November 13, 1934, Serial No. 752,843

2 Claims. (Cl. 259—113)

This invention relates to improvements in mixers and has particular reference to a device for mixing drinks, mayonnaise, or beating, whipping or emulsifying any fluid ingredient.

The principal object of the invention is to produce a mixing device which will cause a rapid and complete mixture of the ingredients being mixed together.

A further object is to produce a device capable of straining the contents of the mixer.

A further object is to produce a device which will agitate a quantity of ice and retain the ice while the drinks are being poured from the mixer.

A still further object is to produce a device wherein seeds, pulp, ice, etc., may first be placed in the container, the agitator inserted and the agitator will automatically gather in and retain all of the solid particles such as seed, pulp and ice within the confines of the agitator, both during agitation and during pouring.

Other objects and advantages will be apparent during the course of the following description.

In the accompanying drawing forming a part of this specification and in which like numerals are employed to designate like parts throughout the same, Fig. I is a vertical cross section through my device, and Fig. II is a horizontal cross section on the line 2—2 of Fig. I.

As the operation of the device is identical, irrespective of the commodity being mixed, I will describe the same as it would be used in the mixing of drinks. With the usual cocktail shaker there are several distinct disadvantages in that it requires considerable effort to properly shake the shaker and consequently many persons will only give the shaker a few shaking movements which is not sufficient to properly frappé the drink. Also the usual shaker has in its top, a small round strainer and if the drink contains any seeds or pulp the strainer soon becomes clogged and consequently the shaker has to be forcibly brought into contact with the table or other support, in order to free the strainer. With this type of shaker it is almost impossible to completely empty the strainer due to rapid clogging when the same is practically empty. Also this type of shaker usually leaks and often comes apart during the shaking operation with the result that the contents spill. Applicant has therefore, devised a shaker which overcomes all of these difficulties.

By referring to the drawing, the numeral 5 designates a container having a top 6 which is provided with a pouring spout 7. A recess 8 provides a return sump for any liquid which may be drawn up between the rod 9. A rubber gasket is shown at 11 which is mounted upon the rod 9 and contacted by a washer 12 secured to the rod. A handle is shown at 13. Suspended on the lower end of the rod 9 is an agitating element 14 of less diameter than the diameter of the cup of the container 5, so as to produce an annular space between the two. This agitator is virtually an inverted cup, which cup is formed of perforated material and carries a flange 16 upon its lower extremity. This flange flares outwardly from the cup at substantially a forty-five degree angle and has its outer edge in close proximity to the inner surface of the container. The washer 12 is preferably arranged upon the rod 9 so that when it contacts the gasket 11 the flange 16 will just avoid contacting the bottom 17 of the container 5.

The manner of using my device is as follows:—

The cover 6 and its attached parts are removed from the container, after which the various ingredients to be mixed are placed within the container. For instance, we will assume that orange juice, lemon juice, including the seeds and pulp, are placed in the container, that a quantity of ice is also placed in the container and if desired any other ingredients, such as syrup, liquor and the like. The top and its attached parts are now returned to the container and as the agitating element passes downwardly into the container the flange 16 will move along the sides of the container and gather into the perforated cup-shaped portion of the agitator, the ice, seeds and the pulp, while the liquid will escape through the openings in the agitator. By now securing the top upon the container and through the medium of the handle 13, moving the agitator up and down, a very rapid and violent mixing of the ingredients will take place for the reason that the flange 16 in moving upwardly causes the liquid above the flange to flow through the perforations of the agitator and thence to a point below the bottom of the agitator. Upon the downward movement of the agitator the flange will cause a very violent flow of the liquid toward the center of the agitator and it will then escape through the perforations to the sides. After the mixing has been completed the parts will be left in the position shown in Fig. I, and the mixed drink can then be poured from the mixer with the assurance that all of the solid particles will be retained within the perforated cup-shaped portion and due to the large straining surface there is no possibility of the device ever becoming clogged and therefore all of the liquid contents may be readily poured from the container.

It will thus be seen that I have produced a device which will mix ingredients quickly, with a minimum amount of effort without causing leakage and I have also produced a device which will thoroughly chill and strain the mixed ingredients.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:—

1. In a device of the character described, a cylindrical container, an inverted cylindrical perforated cup-shaped agitator having a top wall adapted to be reciprocated in said container, said agitator being of less diameter than the diameter of said container whereby an annular space is provided between said agitator and said container, a flange at the lower end of said agitator, said flange extending outwardly and downwardly from said agitator and terminating in close proximity to the inner wall of said container, whereby said annular space between said agitator and the wall of said container will be blocked to the passage of any appreciable amount of material therethrough, with liquid in the container moved by the flange in a circuitous path from the wall of the container into the agitator and means for moving said agitator in said container.

2. In a device of the character described, an agitator adapted to be employed in conjunction with a receptacle, said agitator including an inverted cylindrical perforated cup-shaped member having a top wall, an unperforated flange secured to the bottom of said cup-shaped member, said flange flaring outwardly and downwardly relative to the side walls of said cup-shaped member whereby vertical reciprocation of said cup-shaped member in a liquid will cause said liquid to move into said cup shaped member in a direction towards the axis of said cup-shaped member.

CLAYTON L. DREW.